March 29, 1955  D. P. MARQUIS  2,705,163
TIE ROD END CONSTRUCTION
Filed May 27, 1950
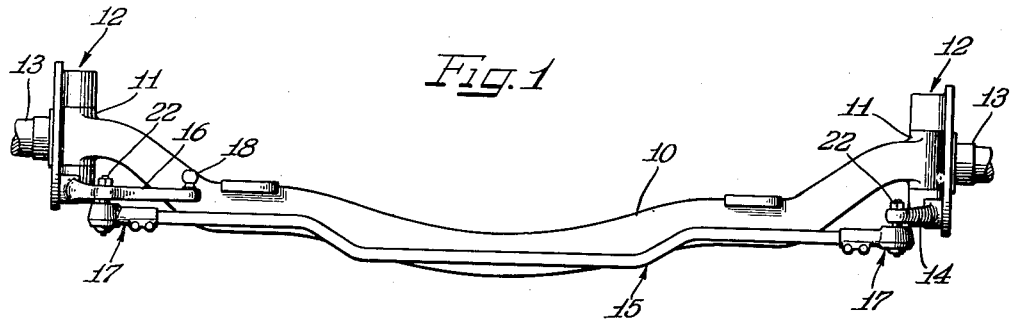
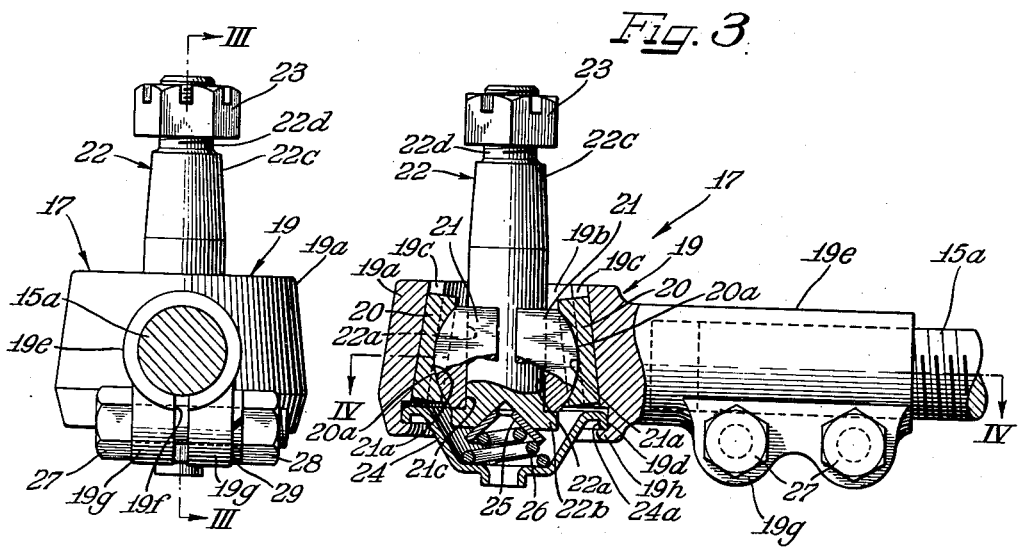
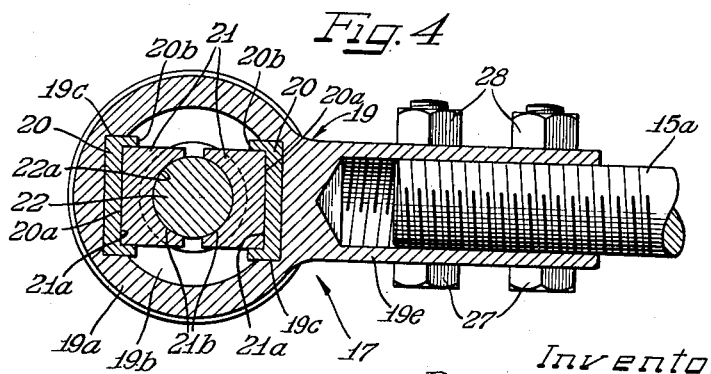
Inventor
Donald P. Marquis
by The Firm of Charles Hills
Attys

United States Patent Office 2,705,163
Patented Mar. 29, 1955

2,705,163

TIE ROD END CONSTRUCTION

Donald P. Marquis, Ferndale, Mich., assignor to Thompson Products, Inc., Cleveland, Ohio, a corporation of Ohio Application May 27, 1950, Serial No. 164,683

3 Claims. (Cl. 287—90)

This invention relates to joint structures having a stud rotatable within a housing and having bearing members therein permitting tilting of the stud in one plane only relative to its housing.

More specifically, this invention relates to a joint structure having a stud rotatably mounted in a pair of inner bearing members which in turn are rockably mounted in a pair of outer bearing members to permit rocking of the stud in a single plane relative to a housing in which the stud and the bearing members are mounted.

According to this invention, a socket member or housing has a substantially frusto-conical hole provided near one end with a pair of coplanar grooves or ways formed longitudinally in the hole. A pair of outer bearing members are slidably disposed in the grooves, and in turn a pair of inner bearing members with outer cylindrical bearing surfaces are mounted in mating cylindrical grooves formed in the inner surfaces of the outer bearing members, the axis of these cylindrical surfaces being perpendicular to the axis of the hole through the housing. A stud having a cylindrical journal portion is mounted with its journal portion mating with cylindrical bearing grooves on the inner surfaces of the inner bearing members and with the axis of the stud normally coincidental with the axis of the hole through the housing. An annular groove is provided at the larger end of the hole and serves to retain a washer which in turn confines a spring between the washer and a head formed at one end of the stud to urge the stud and the bearing members toward the converging ends of the ways in order to maintain proper bearing relation between the stud and the bearing members and to take up any wear which may occur between the various bearing surfaces.

The joints of this invention are especially useful in front wheel suspensions for automobiles or trucks which use vertical kingpins in mounting the wheel assembly. The tie rods connecting the steering arms in these wheel assemblies ofter have center portions offset several inches to avoid an obstruction in the center of the vehicle. In many such cases the obstruction necessitates mounting of the offset center portion tie rod while holding it in a plane substantially out of the horizontal. In addition, it is very difficult to maintain the holes in the steering arms in parallel relationship and to have the steering arm bosses in which the holes are located at exactly the same vertical location. Still further, it is very difficult to maintain straightness of the ends of the offset center portion tie rods to maintain the parallel relationship between the tie rod studs. Consequently, it is customary practice to spring the tie rod into position resulting in continual tension on the bearing of the rod ends which in turn results in premature wear.

It is, therefore, an important object of the present invention to provide a joint in which the stud is rotatable in the housing and rockable in one plane only.

A further object of this invention is to provide a joint of a semi-universal type which includes means for automatically taking up wear between the various bearing surfaces.

Another object of this invention is to provide an easily assembled joint which will allow rocking of a rotatable stud in the plane formed by the axis of the stud and the axis of a connecting member and will preclude rocking of the stud in any other plane.

Still another object of the present invention is to provide a joint with a rotatable stud which is rockable in a single plane only and which is provided with automatic means for taking up wear between the various bearing surfaces.

A specific object of this invention is to provide a semi-universal tie rod end with a rotatable stud rockable in the vertical plane of the tie rod only together with spring means for automatically urging the stud and the mating bearing portions into proper bearing relation.

Other and further objects and features of the present invention will be apparent to those skilled in the art from the following detailed description of the annexed sheet of drawings which illustrates a preferred embodiment of the present invention.

On the drawings:

Figure 1 is a fragmentary side elevational view of a typical front axle and tie rod assembly embodying vertical kingpins and with tie rod ends according to the present invention;

Figure 2 is an inner end elevational view of a joint assembly embodying the present invention;

Figure 3 is a side elevational view partially in section taken along line III—III of Figure 2; and Figure 4 is a sectional plan view taken along line IV—IV of Figure 3.

As shown on the drawings:

Figure 1 illustrates a front axle 10 adapted to receive vertical kingpins at its ends 11 and which is connected by means of kingpins to front wheel supports 12 containing front wheel stub axles 13. One support 12 has a rigidly attached steering arm 14 connected through a tie rod assembly 15 to a steering arm 16 which in turn is rigidly attached to the other support 12.

Attachment of the tie rod assembly 15 to the steering arms 14 and 16 is accomplished by means of tie rod end assemblies 17 which are the subject matter of the present invention. Steering of the wheel support assemblies 12 is accomplished by actuation of steering arm 16 by means of a linkage (not shown) attached to the steering stud 18 located at the end of steering arm 16.

It can be readily seen that full universal movement in joints 17 (Figure 1) is not desirable in the vertical kingpin construction shown, since such a full universal action would allow tie rod assembly 15 to pivot freely about its own longitudinal axis and soon develop excess wear and looseness causing rattling. Any misalignment between the steering arms 14 and 16 or any errors due to bending of the tie rod assembly 15 can be compensated for by allowing the joint stud to pivot in a vertical plane containing the tie rod assembly in such a vertical kingpin construction.

To this end, as shown in the preferred embodiment illustrated in the drawings, each tie rod end 17 has a housing 19 with an end portion 19a of generally cylindrical shape having a frusto-conical hole 19b formed along its cylindrical axis. A pair of grooves or guideways 19c is formed longitudinally on opposite sides of the tapered hole 19b. Slidably fitted in the grooves 19c is a pair of outer bearing members 20 of flat rectangular cross-section each having a cylindrical impression or cylindrical bearing recesses 20a formed in its inner surface. The cylindrical impression 20a is formed with its axis at right angles to the direction of extension of the grooves 19c and does not extend completely across the bearing member 20, consequently leaving a narrow ledge 20b at each side of said cylindrical impression.

A pair of inner bearing members 21, shaped like portions of a cylinder, are provided, with each member of the pair having its outer cylindrical surface 21a of such a size as to mate with the cylindrical impression 20a formed in each of the outer bearing members 20. Sufficient clearance is allowed between the inner bearing member 21 and the outer bearing member 20 to permit rocking of the inner bearing member in a single plane when inserted in the cylindrical impression 20a. Cylindrical impressions or cylindrical bearing recesses 21b are formed on the inner surfaces of each of the bearing members 21 with the cylindrical axis of these impressions at right angles to the cylindrical axis of the outer cylindrical surfaces 21a. The inner cylindrical impressions 21b are of such a size as to mate with a cylindrical journal shank portion 22a of a joint stud 22. The inner bearing member 21 has flat end portions 21c to bear against a head 22b formed at the lower end of stud 22 as seen in Figure 3.

The stud 22 is adapted to be attached to a connecting member such as the steering arms 14 or 16 and to this end has a tapered portion 22c of truncated conical shape which is adapted to mate with a tapered hole formed in the members 14 and 16. A nut 23 fits over the threaded end 22d of the stud 22 to wedge the tapered portion 22c into the mating tapered hole in the steering arms 14 and 16 to insure a tight connection between the stud and the steering arms.

A short frusto-conical bearing insert 25 is placed in a mating conical impression 22e formed in the center of the headed end of stud 22. A coil spring 26, also of generally frusto-conical shape, is inserted with its smaller end upwardly into the under portion of bearing insert 25.

In order to retain spring 26 and bearing insert 25 in proper assembled relationship, a washer 24 of generally bowl-shaped cross-section, having a downwardly turned annular flange 24a, is inserted, open upwardly, into a short counterbored section 19d formed in housing 19 at the large end of hole 19b. The outer edge of the counterbored section 19d is then spun inwardly to form an annular ledge 19h which retains washer 24 within the counterbored section.

Referring to Figures 3 and 4, it can be readily seen that the aforementioned parts are held in proper relationship by action of the spring 26 pressing upwardly from the washer 24 against bearing insert 25 to urge the head 22b of the stud 22 against the flat portion 21c of the inner bearing members 21. Consequently, the inner bearing members 21 through the mating cylindrical surfaces 21a and 20a act to urge the outer bearing members 20 upwardly in the ways 19c toward the smaller end of the hole 19d. As a result, the outer bearing members 20 are urged inwardly against the inner bearing members 21 which in turn are urged against the cylindrical journal portion 22a of the stud 22, and hence the various mating bearing surfaces are held firmly together to maintain a stable, non-rattling joint. In addition, the action of spring 26 serves as an automatic means for taking up wear between the various bearing surfaces. The degree of convergence of the ways 19c and the length and strength of spring 26 are so arranged that the various bearing surfaces will be held in firm but not binding contact.

As can be readily seen in Figures 3 and 4, the stud 22 is rotatable in the housing through action with inner bearing members 21. Through inter-action of the inner bearing members 21 with the outer bearing members 20 by means of the mating cylindrical bearing surfaces, the stud 22 is pivotable in the plane of the paper as shown in Figure 3 about the cylindrical axis of the mating cylindrical bearing surfaces 21a and 20a of the inner and outer bearing members. However, the stud 22 is firmly held against pivoting in any other plane.

For attachment to a connecting member such as the tie rod 15, the housing 19 is provided with an integral elongated cylindrical portion 19e which is internally threaded to receive a threaded end 15a of the tie rod 15. A slot 19f is formed through the wall of the threaded portion 19e and extends longitudinally for substantially the entire length of the threaded portion. A pair of bosses 19g is formed longitudinally along the outer surface of the threaded portion 19e, one disposed on each side of the slot 19f. A pair of bolts 27 are inserted through holes in the bosses 19g across the slot 19f and are provided with nuts 28. After the threaded portion 15a has been inserted into its proper position within the internally threaded connecting portion 19e, the nuts 28 are tightened on the bolts 27 thereby clamping the walls of the connecting portion 19e tightly about the threaded portion 15a of the tie rod 15, consequently providing a rigid non-rotating connection. Lock washers 29 are inserted between the nuts 28 and the bosses 19g to preclude any possibility of loosening of the nuts.

From the above descriptions it should be understood that this invention provides a tie rod joint assembly wherein a stud rotates about its own axis in opposed bearing members which are rockably mounted in seats or outer bearing members that are slidable in converging ways in a housing. The stud has a head providing a shoulder which is urged by a spring against bottom faces of the opposed bearing members to urge both sets of bearing members toward the converging ends of the ways thereby maintaining the parts in proper assembly and taking up any excessive clearance therebetween.

It will be understood that modifications and variations may be effected without departing from the scope of the novel concepts of the present invention.

I claim as my invention:

1. A joint comprising a housing having a hole therethrough with converging ways formed longitudinally therein, a stud having a cylindrical journal portion rotatably mounted within said hole, said stud having a head formed at one end thereof with a conical impression formed in the end of said head, a generally conical bearing member inserted in said conical impression, a coil spring of substantially frusto-conical shape inserted with its smaller end in said conical bearing member, a generally bowl-shaped member attached at one end of the hole through said housing and serving to confine said spring between said bowl-shaped member and said conical bearing member to urge said bearing member and said stud toward the other end of the hole in said housing member, inner bearing means adapted to rotatably receive the cylindrical journal portion of said stud, and outer bearing members rockably receiving said inner bearing members, said outer bearing members being slidably, non-rotatably disposed in the converging ways formed in the hole in said housing.

2. A joint comprising a housing having a hole therethrough, longitudinal opposed converging guideways formed within said hole, a pair of outer bearing members slidable longitudinally in said guideways and held thereby against rotation, said outer bearing members having inner cylindrical bearing recesses formed in the inwardly disposed surfaces thereof with a common axis perpendicular to the axis of said housing hole, a pair of inner bearing members with outer cylindrical bearing surfaces slidably disposed within the bearing recesses in said outer bearing members, each of said inner bearing members having an inner cylindrical bearing recess with a common axis perpendicular to the axis of said outer cylindrical surfaces, a stud having a head formed at one end thereof and a cylindrical portion adjacent said head, said cylindrical portion being received rotatably within said inner cylindrical recesses of said inner bearing members and said head abutting an end of each inner bearing member, said stud having a shank portion extending through said hole and out of said housing, spring retaining means acting on the stud to urge the head against the inner bearing members and bias the outer bearing members toward the inner bearing members within said housing in proper bearing relation, and convergent ends of the guideways thereby retaining the means for attaching said housing to a connecting member.

3. A tie rod end construction adapted to restrain a tie rod against tilting about its longitudinal axis comprising a housing having a hole therethrough with spaced opposed converging flat bottomed guideways formed longitudinally therein, a stud having a cylindrical portion, a pair of inner bearing members rotatably receiving said cylindrical bearing portion of said stud therethrough, said inner bearing members having cylindrical outer bearing surfaces with a common axis perpendicular to the axis of said stud, a pair of outer bearing members with inner cylindrical bearing recesses formed therein, the cylindrical outer bearing surfaces on said inner bearing members being rockably disposed within the inner cylindrical bearing recesses formed in said outer bearing members and permitting said stud and said inner bearing members to tilt as a unit in one plane only, said outer bearing members being mounted slidably and non-rotatably in the guideways formed within the hole in said housing, spring means urging said stud, said inner bearing members and said outer bearing members toward the converging ends of said spaced opposed guideways to retain said stud and said bearing members within said housing and to automatically take up wear between said stud and said bearing members, and means for attaching said housing to a tie rod.

(References on following page)

References Cited in the file of this patent

UNITED STATES PATENTS

| | | | |
|---|---|---|---|
| 1,332,898 | Hossie et al. | Mar. 9, 1920 |
| 1,770,846 | Dahlquist | July 15, 1930 |
| 1,799,141 | Hufferd et al. | Mar. 31, 1931 |
| 1,957,781 | Hufferd | May 8, 1934 |
| 2,003,539 | Hufferd | June 4, 1935 |
| 2,102,463 | Hufferd | Dec. 14, 1937 |
| 2,206,972 | Niles | July 9, 1940 |
| 2,208,325 | Krutsch | July 16, 1040 |
| 2,426,358 | Klages et al. | Aug. 26, 1947 |
| 2,521,335 | Booth | Sept. 5, 1950 |

Note: 1,957,781 Hufferd Mar. 8, 1934 also listed.